United States Patent Office 3,426,250
Patented Feb. 4, 1969

3,426,250
CONTROLLED REDUCTION AND REOXIDATION OF BaTiO₃ CAPACITORS AND RESULTING CAPACITOR
Manfred Kahn, Williamstown, Mass., assignor to Sprague Electric Company, North Adams, Mass., a corporation of Massachusetts
Filed Aug. 1, 1966, Ser. No. 569,308
U.S. Cl. 317—230         8 Claims
Int. Cl. H01g 9/00, 9/22, 13/00

ABSTRACT OF THE DISCLOSURE

A barium titanate capacitor has a thick semiconducting zone and a thin dielectric zone. At least one large crystallite extends from the semiconducting zone into the dielectric zone. The semiconducting zone is characterized by reduction, at least along its grain boundaries, and that portion of the crystallite therein is reduced to a depth not exceeding the average radius of the grains. The dielectric zone, including that portion of the crystallite extending therein, is completely reoxidized. An electrode is affixed to the dielectric zone.

---

Ceramic Body And Process For Forming The Same

This invention relates to ceramic bodies and more particularly to the production of semiconducting ceramic bodies and capacitors utilizing the same. Ceramic materials have widespread application in the electrical industry as dielectric or semiconducting bodies. It is well established in the art that the electrical properties of a ceramic body depend on the chemical composition and the grain structure of the body.

A prior art process yielding a physically thick ceramic capacitor having extremely thin dielectric layers comprises the following steps: (a) forming a dielectric titanate body by firing a green titanate body in air at a temperature of about 2450° F. (b) converting the dielectric body to a semiconducting body by firing it in a reducing atmosphere, e.g., carbon monoxide or hydrogen, at a temperature between about 2100–2300° F., (c) applying silver electrodes to opposite sides of the reduced body and firing the unit in an oxidizing atmosphere, e.g., air or oxygen, to reoxidize the surface of the body beneath the electrodes. An oversimplified definition of the structure is that it is a pair of capacitors, series-connected by the semiconducting zone of the ceramic body.

The prior art conversion from a mature ceramic to a semiconducting body is carried out primarily with a view to obtaining the lowest possible resistivity. As a result the ceramic is invariably reduced excessively. Furthermore, during the conversion of the green titanate to a mature dielectric body, a few comparatively large crystallites or dendrites are often formed. The size of these crystallites, in relation to the otherwise uniform matrix, ranges upwards of 5–10 times larger than the average grain size of said matrix. During the prior art reduction firing step, the entire ceramic, including all of the crystallites, are completely reduced.

During the prior art reoxidation, very thin dielectric layers are formed on opposite sides of the semiconducting body. It has been determined that some of the oversize crystallites extend from the semiconducting region into or through the very thin dielectric region. This condition has been established to be a source of capacitor failure. During reoxidation only a very thin surface portion near the end of the crystallite is reoxidized. Because the layer is thin and the electric field is high, the ends of the crystallites are easily shorted through, thereby providing a direct low resistance leakage path into the semiconducting region of the ceramic.

It is an object of the present invention to present an improved ceramic reduction process.

A further object is to produce a ceramic body for use in a ceramic capacitor.

A still further object is to present an improved low temperature ceramic reduction process.

Other objects and advantages of the present invention will be made obvious to those skilled in the art by the following description when considered in relation to the accompanying drawings of which:

In general, the objects of the present invention are obtained by preparing a mature dielectric ceramic having a relatively uniform microstructure and subjecting the dielectric body to reducing conditions calculated to reduce the ceramic only along its grain boundaries. Other objects of the present invention are obtained by preparing a mature dielectric ceramic titanate body having a relatively uniform matrix but having at least one crystallite therein, which is at least from 5–10 times larger than the average grain size of said matrix, subjecting said dielectric body to reducing conditions calculated to reduce at least the grain boundaries of said matrix and at most said crystallite to a depth not substantially exceeding the average radius of the grains of said matrix.

The foregoing conditions can readily be determined by one skilled in the art by establishing a range of reducing conditions for any given ceramic body which at the lower end is limited by excessive resistance in the semiconductor and at the higher end is evidenced by a thorough reduction of the grains of the ceramic. In ceramic bodies which have oversize crystallites the higher end of reducing conditions is evidenced by the complete reduction of the oversize crystallites. Complete reduction of these crystallites is evident when they turn shiny black in appearance in contrast to the dark grey of the matrix. The range of reducing conditions is controlled by the temperature and the partial pressure of oxygen present in the reducing atmosphere.

Figure 1:
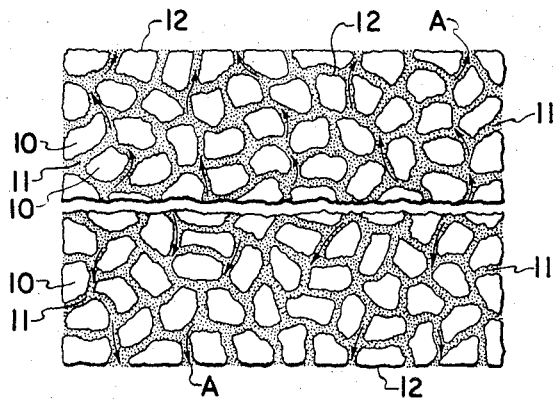
FIGURE 1 is a schematic cross-section through a ceramic body constructed according to this invention, showing grains of ceramic material and diagrammatically illustrating the formation of a semiconductor.
Figure 2:
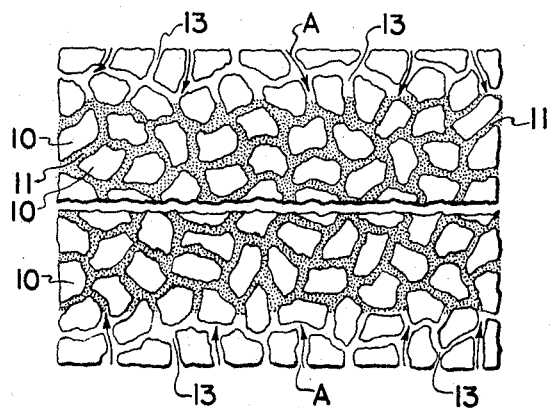
FIGURE 2 is a schematic cross-section of the ceramic body of FIGURE 1 diagrammatically illustrating reoxidation of said body.
Figure 3:
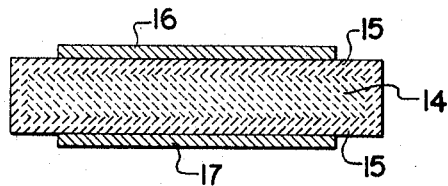
FIGURE 3 is a cross section of a capacitor in accordance with the present invention.

Referring to the drawing, FIGURE 1 shows a cross-section through a ceramic body which is in the process of being reduced. The crystalline barium titanate grains 10 have grain boundary regions 11. For purposes of illustration only, the bulk of each grain is shown at 10 as being a discrete particle having a surface 12, whereas the boundary regions 11 are shown as uniting to form a continuous body. That is, a portion of the material 11 between the two grains 10 forms the surface of one grain and the remainder belongs to the adjacent grain. The grain boundary regions 11 are illustrated as having a finite width, in order to emphasize that these regions have a substantially higher degree of crystal imperfections than the bulk 10 of the crystals. It is from and through these boundary regions that oxygen courses out of the barium titanate body, as illustrated by the arrows A. When the ceramic is sufficiently reduced along the grain boundaries the unit will have semiconducting characteristics. FIGURE 2 shows the ceramic of FIGURE 1 being reoxidized (arrows A) at the grain boundaries 13 near the surfaces of the body. FIGURE 3 shows a ceramic capacitor according to the present invention comprising semiconducting zone 14 and dielectric zone 15 and electrodes 16 and 17 on opposite sides of the ceramic.

EXAMPLE I

A series of barium titanate discs .325″ x .030″ each were prepared. These discs were fired to maturity in an oxygen containing atmosphere at 2450° F. for a period of about 60 minutes. The average grain size of the ceramic was about 25 microns. Six of the discs were placed in a nitrogen atmosphere which contained about $10^{-4}$ atmospheres of $O_2$. The discs were subjected to a temperature of about 2350° F. for a period of 2 hours. The so-treated discs had a resistivity above 100,000 ohm-cm. These reducing conditions did not bring the ceramic bodies within the semiconductive range, which for most practical purposes is considered to start at about 50,000 ohm-cm. and extends down to below 0.5 ohm-cm. Six more discs were placed in a nitrogen atmosphere containing between $10^{-5}$–$10^{-7}$ atmosphere of $O_2$ and treated at 2350° F. for a period of 2 hours. These discs had an average resistivity of about 50 ohm-cm. These reducing conditions are clearly within the semiconductive range. Six more discs were placed in a nitrogen atmosphere containing less than $10^{-8}$ atmospheres of oxygen and fired at 2350° F. for a period of 2 hours. These discs had an average resistivity below 1 ohm-cm. and microscopic examination of these discs revealed that the discs were black or blue-black throughout.

The foregoing example shows the employment of three different reducing conditions. The first set of conditions was insufficient to reduce the ceramic body to a point where it could be considered a semiconductor. The second set of conditions can be considered optimum for the particular ceramic employed since these conditions resulted in a semiconductor having a resistivity of about 50 ohm-cm. The temperature can range between about 2100° F.–2400° F. The third set of conditions produced a ceramic having a resistivity below 1 ohm-cm. These conditions are considered to be too severe. For the subsequent manufacture of a capacitor by reoxidation of the ceramic, a high degree of reduction is not desirable. To get a uniform dielectric layer both the grain boundaries and the center of the grains should be reoxidized. The diffusion speed of oxygen along the grain boundaries is greater than the speed of diffusion of oxygen into the grains. If the centers of the grains are reduced, parts of or all of the reoxidized layer or layers will have only the grain boundaries and not the center of the grains reoxidized. This nonuniformly reoxidized layer or layers will cause the capacitor to have a higher loss factor and a lower frequency cutoff than a capacitor with a layer completely reoxidized throughout.

It is difficult to form fine grain ceramic bodies which do not have at least some large crystallites present. When there are large crystallites present, their presence can be employed as a control on the higher reducing conditions. Microscopic examination of the reduced bodies will reveal when these large crystallites begin to show appreciable reduction into their core. When this occurs reducing conditions are too severe and the oxygen partial pressure should be reduced.

The following example illustrates that the reducing temperature can be considerably lowered, particularly when the average grain size of barium titanate is below 5 microns.

EXAMPLE II

A series of barium titanate discs, .325″ x .030″ each, were prepared from a high purity, one micron particle size barium titanate powder. These discs were fired to maturity in an oxygen-containing atmosphere at 2375° F. for a period of 60 minutes. The barium titanate starting material was of a type and particle size which would fire to an average grain size below 5 microns. The powder employed is described in U.S. 3,231,328, issued Jan. 25, 1966, to M. Pechini. The fired discs had a dielectric constant of about 3000. Six discs were placed in a carbon monoxide atmosphere and reduced at a temperature of 1450° F. for a period of 4 hours. The resulting reduced discs had an average resistivity of 3 ohm-cm. Microscopic examination of the discs revealed that the few comparatively large crystallites present were not reduced to any significant degree. Six other units were placed in a carbon monoxide atmosphere and treated at a temperature of 2350° F. for 4 hours. The average resistivity of these units was 1 ohm-cm. Microscopic examination of these discs showed that they were completely reduced including the comparatively large crystallites present. Capacitors were made from these discs by applying silver electrodes to opposite sides of the disc and reoxidizing the units in an oxygen containing atmosphere for a period of 30 minutes.

Three of the discs reduced at 1450° F. were reoxidized at 1225° F. and the other three discs which were reduced at 1450° F. were reoxidized at 1400° F. The six units reduced at 2350° F. were also reoxidized at 1400° F. The following electrical characteristics were observed.

| Reduction temperature (° F.) | Reoxidation temperature (° F.) | Capacitance (μf.) | Dissipation factor, (percent) | Average leakage current |
|---|---|---|---|---|
| 1,450 | 1,225 | .023 | 2.4 | .32 μa at 10 v. |
| 1,450 | 1,400 | .0092 | 1.9 | .0002 μa at 10 v. |
| 2,350 | 1,400 | .019 | 1.7 | 3.0 μa at 4 v. |

It will be noted that the units reduced at the lower temperature also were more effectively reoxidized at a lower temperature and had a lower leakage current at a higher voltage with more capacitance than the units reduced at the higher temperature. Moreover, the comparatively large crystallites in the units which were reduced at the lower temperature were not reduced to any considerable degree and therefor these crystallites can not be a failure source on life test. The three discs reduced at 1450° F. and reoxidized at 1400° F. were actually overoxidized at this temperature as evidenced by the lower capacitance.

The following example serves to illustrate that the present invention is applicable to other than pure barium titanate.

EXAMPLE III

Barium titanate of about one micron particle size was combined with from 0.2 to 0.4% $Nb_2O_5$ in accordance with the example of applicant's copending application Ser. No. 569,088, filed of even date. This material was formed into 0.45″ diameter discs and fired in an oxygen-containing atmosphere at 2500° F. The $Nb_2O_5$ introduced into the barium titanate in the manner described in the aforementioned copending application is a grain growth inhibitor. The average grain size of the fired units did not exceed two microns. The fired discs, which had a dielectric constant of about 4000, were placed in a carbon monoxide atmosphere and reduced at a temperature of about 1550° F. for about 1 hour. The reduced discs had an average resistivity of about 18 ohm-cm. Several other units were placed in a carbon monoxide atmosphere and fired at 2150° F. for 1 hour.

| Reduction temperature (° F.) | Reoxidation temperature (° F.) | Capacitance (μf.) | Dissipation factor, (percent) | Average leakage current |
|---|---|---|---|---|
| 1,550 | 1,400 | .041 | 3.7 | .013 μa at 10 v. |
| 2,150 | 1,400 | .036 | 4.0 | 7.5 μa at 10 v. |

Again it will be noted that the units which were reduced at the lower temperature had a lower leakage current with a higher capacitance than the units reduced at the higher temperature.

It is to be understood that the reducing atmosphere can be carbon monoxide, hydrogen, forming gas, a partial vacuum or any other atmosphere or condition calculated to reduce the ceramic to a semiconducting state.

The capacitor of the present invention can be a simple capacitor having a single thin dielectric layer adjacent the semiconductive zone of the ceramic. An electrode affixed to the single dielectric layer will complete the capacitor since the counterelectrode is the semiconductive zone of the ceramic. It will be understood by one skilled in the art that it is necessary to affix an electrode contact to the semiconductive zone. This contact can be any prior art material such as silver, palladium, etc. In the situation where opposite surfaces of the semiconductive ceramic is reoxidized, electrodes will be affixed to both dielectric layers forming two capacitors. An oversimplified definition of this unit is that it is two capacitors which are series-connected via the semiconductive zone.

The present invention extends to the reduction of any titanate body either unmodified or modified my specific additives. Examples are pure alkaline earth metal titanates and any titanate grain growth inhibited with $Nb_2O_5$, $Ta_2O_5$ and $V_2O_5$.

Since it is obvious that many changes and modifications can be made in the above-described details without departing from the nature and spirit of the invention it is to be understood that the invention is not limited to said details except as set forth in the appended claims.

What is claimed is:

1. A method for forming a semiconducting body comprising; preparing a mature dielectric ceramic titanate, wherein said ceramic titanate has a relatively uniform grain matrix which has at least one crystallite therein from 5–10 times larger than the average grain size of said matrix, and subjecting the dielectric body to reducing conditions for reducing at least the grain boundaries of said matrix and at most said crystallite to a depth not substantially exceeding the average radius of the grains of said matrix.

2. The method of claim 1 wherein the average grain size of said ceramic is less than 5 microns.

3. The method of claim 1 wherein the oxygen pressure of the reducing conditions is between $10^{-5}$–$10^{-7}$ atmospheres and the temperature is between about 2100–2400° F.

4. The method of claim 2 wherein the ceramic is reduced at a temperature of between about 1200–1800° F. for a time sufficient to convert said body to a semiconductor.

5. A ceramic capacitor comprising a barium titanate body consisting essentially of a comparatively thick semiconducting zone having a comparatively thin dielectric zone adjacent at least one side thereof, said barium titanate having a relatively uniform matrix, said matrix having at least one crystallite, 5–10 times larger than the average grain size of said matrix, extending from said semiconducting zone into said dielectric zone; said semiconducting zone being characterized by reduction at least along the grain boundaries of said matrix; said dielectric zone being characterized by substantially complete reoxidation; that portion of said crystallite within the semiconducting zone being reduced to a depth not substantially exceeding the average radius of the grains of said matrix and that portion of said crystallite extending into said dielectric zone being completely reoxidized; and an electrode affixed to said dielectric zone.

6. The capacitor of claim 5 wherein said barium titanate is grain growth inhibited with a member of the group consisting of $Nb_2O_5$, $Ta_2O_5$ and $V_2O_5$.

7. The capacitor of claim 5 having a dielectric zone adjacent only one surface of said semiconducting zone and an electrode contact affixed to said semiconducting zone.

8. The capacitor of claim 5 having a dielectric zone adjacent opposite surfaces of said semiconducting zone.

References Cited

UNITED STATES PATENTS

| | | | |
|---|---|---|---|
| 2,962,452 | 11/1960 | Counts et al. | 252—520 |
| 3,033,907 | 5/1962 | Rue | 252—520 |
| 3,036,018 | 5/1962 | Pieras | 252—520 |
| 3,268,783 | 8/1966 | Saburi | 317—230 |

FOREIGN PATENTS

| | | |
|---|---|---|
| 714,965 | 9/1954 | Great Britain. |

OTHER REFERENCES

Hausner: Journal of the American Ceramic Society, vol. 30, No. 9; pp. 290–296, 1947.

JAMES D. KALLAM, *Primary Examiner.*

U.S. Cl. X.R.

252—520; 317—258